(12) United States Patent
Schrans et al.

(10) Patent No.: US 10,028,041 B2
(45) Date of Patent: Jul. 17, 2018

(54) OPTICAL SWITCH ARCHITECTURE

(71) Applicant: ROCKLEY PHOTONICS LIMITED, London (GB)

(72) Inventors: Thomas Pierre Schrans, Temple City, CA (US); Cyriel Johan Agnes Minkenberg, Neuheim (CH); Nathan Farrington, Arcadia, CA (US); Andrew George Rickman, Marlborough (GB)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 15/461,421

(22) Filed: Mar. 16, 2017

(65) Prior Publication Data

US 2017/0195758 A1    Jul. 6, 2017

Related U.S. Application Data

(63) Continuation-in-part of application No. 15/072,314, filed on Mar. 16, 2016, now Pat. No. 9,706,276, and
(Continued)

(30) Foreign Application Priority Data

Jun. 28, 2016 (GB) .................................. 1611197.3
Jun. 30, 2016 (GB) .................................. 1611433.2

(51) Int. Cl.
*H04Q 11/00* (2006.01)
*H04L 12/933* (2013.01)

(52) U.S. Cl.
CPC ..... *H04Q 11/0071* (2013.01); *H04L 49/1515* (2013.01); *H04Q 11/0005* (2013.01);
(Continued)

(58) Field of Classification Search
CPC .......... H04Q 11/0071; H04Q 11/0005; H04Q 11/0066; H04Q 2011/0032; H04Q 2011/0033; H04L 49/1515
(Continued)

(56) References Cited

U.S. PATENT DOCUMENTS 6,285,809 B1    9/2001    Nir et al.
6,510,260 B2    1/2003    Chen et al.
(Continued)

FOREIGN PATENT DOCUMENTS

CA    2 386 352 A1    11/2003
GB    2530833 A    4/2016
(Continued)

OTHER PUBLICATIONS

Andreyev, Alexey, "Introducing data center fabric, the next-generation Facebook data center network", Facebook, Facebook Code, Engineering Blog, Nov. 14, 2014, 13 pages.
(Continued)

*Primary Examiner* — Dalzid Singh
(74) *Attorney, Agent, or Firm* — Lewis Roca Rothgerber Christie LLP

(57) ABSTRACT

An optoelectronic switch for transferring a signal from an input device for an output device, the optoelectronic switch including: a plurality of leaf switches, each having a radix R, and arranged in an L-dimensional array, in which the i-th dimension has a size $R_i$ where (i=1, 2, ..., L) and for a reduced dimension, $R_i$ is less than for all of the other dimensions, each leaf switch having an associated L-tuple of coordinates $(x_1, \ldots, x_L)$ giving its location with respect to each of the L dimensions; wherein each leaf switch is a member of L sub-arrays, each of the L sub-arrays associated with a different one of the L dimensions, and including: a plurality of $R_i$ leaf switches whose coordinates differ only in
(Continued)

respect of the i-th dimension, each leaf switch having C client ports for connecting to an input device or an output device.

16 Claims, 10 Drawing Sheets

Related U.S. Application Data a continuation-in-part of application No. PCT/EP2016/076755, filed on Nov. 4, 2016, which is a continuation-in-part of application No. 15/072,314, filed on Mar. 16, 2016, now Pat. No. 9,706,276, and a continuation-in-part of application No. PCT/GB2016/051127, filed on Apr. 22, 2016, which is a continuation-in-part of application No. 15/072,314, filed on Mar. 16, 2016, now Pat. No. 9,706,276, application No. 15/461,421, which is a continuation-in-part of application No. PCT/GB2016/051127, filed on Apr. 22, 2016, which is a continuation-in-part of application No. 15/072,314, filed on Mar. 16, 2016, now Pat. No. 9,706,276.

(60) Provisional application No. 62/309,425, filed on Mar. 16, 2016, provisional application No. 62/354,600, filed on Jun. 24, 2016, provisional application No. 62/251,572, filed on Nov. 5, 2015, provisional application No. 62/152,696, filed on Apr. 24, 2015, provisional application No. 62/234,454, filed on Sep. 29, 2015, provisional application No. 62/364,233, filed on Jul. 19, 2016.

(52) U.S. Cl.
CPC . *H04Q 11/0066* (2013.01); *H04Q 2011/0032* (2013.01); *H04Q 2011/0033* (2013.01)

(58) Field of Classification Search
USPC .......................................................... 398/49
See application file for complete search history.

(56) References Cited

U.S. PATENT DOCUMENTS

| | | |
|---|---|---|
| 6,512,612 B1 | 1/2003 | Fatehi et al. |
| 6,529,301 B1 | 3/2003 | Wang |
| 7,088,919 B2 | 8/2006 | Graves |
| 7,177,544 B1 | 2/2007 | Wada et al. |
| 7,218,853 B2 | 5/2007 | Handelman |
| 7,257,283 B1 | 8/2007 | Liu et al. |
| 7,260,329 B1 | 8/2007 | Fall et al. |
| 7,389,046 B1 | 6/2008 | Tanaka et al. |
| 7,426,210 B1 | 9/2008 | Miles et al. |
| 7,526,603 B1 | 4/2009 | Abdollahi-Alibeik et al. |
| 7,577,355 B2 | 8/2009 | Sato et al. |
| 7,590,359 B2 | 9/2009 | Kim et al. |
| 7,724,759 B2 | 5/2010 | Bozso et al. |
| 7,764,882 B2 | 7/2010 | Beacken |
| 7,773,606 B2 | 8/2010 | Dobjelevski et al. |
| 7,773,608 B2 | 8/2010 | Miles et al. |
| 7,872,990 B2 | 1/2011 | Guo et al. |
| 7,899,327 B2 | 3/2011 | Wada et al. |
| 8,065,433 B2 | 11/2011 | Guo et al. |
| 8,073,327 B2 | 12/2011 | Mayer et al. |
| 8,098,593 B2 | 1/2012 | Guo et al. |
| 8,472,805 B2 | 6/2013 | Lam et al. |
| 8,473,659 B2 | 6/2013 | Koka et al. |
| 8,493,976 B2 | 7/2013 | Lin |
| 8,774,625 B2 | 7/2014 | Binkert et al. |
| 8,792,787 B1 | 7/2014 | Zhao et al. |
| 8,867,915 B1 | 10/2014 | Vandat et al. |
| 8,891,914 B2 | 11/2014 | Ticknor et al. |
| 8,902,751 B1 | 12/2014 | Zhou et al. |
| 8,942,559 B2 | 1/2015 | Binkert et al. |
| 9,008,510 B1 | 4/2015 | Zhao et al. |
| 9,124,383 B1 | 9/2015 | Frankel et al. |
| 9,167,321 B2 | 10/2015 | Chen |
| 9,184,845 B1 | 11/2015 | Vandat et al. |
| 2002/0057861 A1 | 5/2002 | Ge et al. |
| 2002/0114036 A1 | 8/2002 | Ghani |
| 2002/0186432 A1 | 12/2002 | Roorda et al. |
| 2003/0138189 A1 | 7/2003 | Rockwell et al. |
| 2005/0105906 A1 | 5/2005 | Barbosa et al. |
| 2007/0009262 A1 | 1/2007 | Perkins et al. |
| 2009/0226183 A1 | 9/2009 | Kang |
| 2010/0254703 A1 | 10/2010 | Kirkpatrick et al. |
| 2012/0033968 A1 | 2/2012 | Testa et al. |
| 2012/0201540 A1 | 8/2012 | Uekama et al. |
| 2012/0243869 A1 | 9/2012 | Sato |
| 2012/0250574 A1* | 10/2012 | Marr ..................... G02B 6/354 370/254 |
| 2013/0156425 A1* | 6/2013 | Kirkpatrick .......... H04B 10/801 398/45 |
| 2015/0249501 A1 | 9/2015 | Nagarajan |
| 2015/0309265 A1 | 10/2015 | Mehrvar et al. |
| 2017/0041691 A1 | 2/2017 | Rickman et al. |
| 2017/0111294 A1* | 4/2017 | Laor ..................... H04L 49/101 |
| 2017/0295130 A1* | 10/2017 | Mahajan ............... H04L 61/103 |

FOREIGN PATENT DOCUMENTS

| | | |
|---|---|---|
| WO | WO 2007/124514 A2 | 11/2007 |
| WO | WO 2013/063543 A1 | 5/2013 |
| WO | WO 2014/180292 A2 | 11/2014 |
| WO | WO 2015/060820 A1 | 4/2015 |

OTHER PUBLICATIONS

Farrington, Nathan et al., "Data Center Switch Architecture in the Age of Merchant Silicon", High Performance Interconnects, Aug. 25, 2009, pp. 93-102.

Farrington, Nathan et al., "Facebook's Data Center Network Architecture", 2013 Optical Interconnects Conference, May 1, 2013, pp. 49-50.

International Search Report and Written Opinion of the International Searching Authority, dated Jun. 30, 2017, Corresponding to PCT/EP2017/056129, 19 pages.

Padmanabhan, Krishnan et al., "Dilated Networks for Photonic Switching", IEEE Transactions on Communications, Dec. 1987, pp. 1357-1365, vol. COM-35, No. 12.

"2000 Networkers", Campus Switch Architecture Session 2806, Cisco Systems, Inc., 2000, 65 pages.

"66AK2E0x Multicore DSP+ARM KeyStone II System-on-Chip (SoC)", System Interconnect, Texas Instruments Incorporated, 2012-2015, pp. 1-282.

Ahn, Jung Ho et al., "HyperX: Topology, Routing, and Packaging of Efficient Large-Scale Networks", ACM, SC'09, Nov. 14-20, 2009, 11 pages, Portland, Oregon, USA.

Arimilli, Baba et al., "The PERCS High-Performance Interconnect", 18th IEEE Symposium on High Performance Interconnects, 2010, pp. 75-82.

Bhuyan, Laxmi N. et al., "Generalized Hypercube and Hyperbus Structures for a Computer Network", IEEE Transactions on Computers, Apr. 1984, pp. 323-333, vol. C-33, No. 4.

Dumais, Patrick et al., "Scaling up Silicon Photonic Switch Fabrics", IEEE, 2015, pp. 175-176.

Guo, Chuanxiong et al., "BCube: A High Performance, Server-centric Network Architecture for Modular Data Centers", ACM, SIGCOMM'09, Aug. 17-21, 2009, Barcelona, Spain.

"Hot Interconnects 22", IEEE Symposium on High Performance Interconnects, Aug. 26-28, 2014, 1 page, Google Headquarters, Mountain View, California.

Invitation to Pay Additional Fees and Partial Search Report dated Feb. 23, 2017 in related International Application No. PCT/EP2016/076755, 8 pages.

(56) References Cited

OTHER PUBLICATIONS

Iyer, Sundar et al., "Techniques for Fast Shared Memory Switches", Stanford HPNG Technical Report TR01-HPNG-081501, 2001, 12 pages.
Kachris, Christoforos et al., "A Survey on Optical Interconnects for Data Centers", IEEE Communications Surveys & Tutorials, Oct. 1, 2012, pp. 1021-1036, vol. 14, No. 4.
Mandyam, Lakshmi et al., "Switch Fabric Implementation Using Shared Memory", Freescale Semiconductor, Inc., 2004, pp. 1-8.
Miao, Wang et al., "Novel flat datacenter network architecture based on scalable and flow-controlled optical switch system", Optics Express, Feb. 10, 2014, 8 pages, vol. 22, No. 3.
Miao, Wang et al., "Petabit/s Data Center Network Architecture with Sub-microseconds Latency Based on Fast Optical Switches", Ecoc-ID: 0630, 2015, 3 pages.
Parsons, N.J. et al., "Multidimensional Photonic Switches", Photonic Switching II, Proceedings of the International Topical Meeting, Apr. 12-14, 1990, pp. 364-369, Kobe, Japan.
Shekel, Eyal et al., "Optical packet switching", Proc. Of SPIE, 2005, pp. 49-62, vol. 5625.
Suzuki, Keijiro et al., "Ultra-compact 8 x 8 strictly-non-blocking Si-wire PILOSS switch", Optics Express, Feb. 24, 2014, 8 pages, vol. 22, No. 4.
Tabatabaee, Vahid, "Switch Fabric Architectures", University of Maryland, ENTS689L: Packet Processing and Switching, Fall 2006, pp. 1-18.
U.K. Intellectual Property Office Search Report, dated Nov. 29, 2016, Received Dec. 1, 2016, for Patent Application No. GB1611197.3, 3 pages.
Wu, Haitao et al., "MDCube: A High Performance Network Structure for Modular Data Center Interconnection", ACM, CoNEXT'09, Dec. 1-4, 2009, Rome, Italy.
Zahavi, Eitan, "Fat-tree routing and node ordering providing contention free traffic for MPI global collectives", Journal of Parallel and Distributed Computing, 2012, pp. 1-10.
Zahavi, Eitan et al., "Quasi Fat Trees for HPC Clouds and their Fault-Resilient Closed-Form Routing", HOTI 2014, pp. 1-21.

\* cited by examiner

OPTICAL SWITCH ARCHITECTURE

CROSS-REFERENCE TO RELATED APPLICATION(S)

The present application (a) claims the benefit of U.S. Provisional Application 62/309,425, filed Mar. 16, 2016, and (b) claims the benefit of U.S. Provisional Application 62/354,600, filed Jun. 24, 2016, and (c) is a continuation-in-part of U.S. patent application Ser. No. 15/072,314, filed Mar. 16, 2016, which claims the benefit of U.S. Provisional Application 62/251,572, filed Nov. 5, 2015, and (d) is a continuation in part of PCT Application PCT/EP2016/076755, filed Nov. 4, 2016, which claims priority to (i) U.S. patent application Ser. No. 15/072,314, filed Mar. 16, 2016, which claims the benefit of U.S. Provisional Application 62/251,572, filed Nov. 5, 2015, and to (ii) U.S. Provisional Application 62/309,425, filed Mar. 16, 2016, and to (iii) PCT Application PCT/GB2016/051127, filed Apr. 22, 2016, which claims priority to (1) U.S. Provisional Application 62/152,696, filed Apr. 24, 2015, and to (2) U.S. Provisional Application 62/234,454, filed Sep. 29, 2015, and to (3) U.S. patent application Ser. No. 15/072,314, filed Mar. 16, 2016, which claims the benefit of U.S. Provisional Application 62/251,572, filed Nov. 5, 2015, and to (iv) U.S. Provisional Application 62/354,600, filed Jun. 24, 2016, and to (v) foreign application No. 1611433.2, filed in Great Britain on Jun. 30, 2016, which claims priority to (1) U.S. patent application Ser. No. 15/072,314, filed Mar. 16, 2016, which claims the benefit of U.S. Provisional Application 62/251,572, filed Nov. 5, 2015, and to (2) U.S. Provisional Application 62/309,425, filed Mar. 16, 2016, and to (3) U.S. Provisional Application 62/354,600, filed Jun. 24, 2016, and to (4) PCT Application PCT/GB2016/051127, filed Apr. 22, 2016, which claims priority to (A) U.S. Provisional Application 62/152,696, filed Apr. 24, 2015, and to (B) U.S. Provisional Application 62/234,454, filed Sep. 29, 2015, and to (C) U.S. patent application Ser. No. 15/072,314, filed Mar. 16, 2016, which claims the benefit of U.S. Provisional Application 62/251,572, filed Nov. 5, 2015, and to (vi) foreign application No. 1611197.3, filed in Great Britain on Jun. 28, 2016, which claims priority to U.S. patent application Ser. No. 15/072,314, filed Mar. 16, 2016, which claims the benefit of U.S. Provisional Application 62/251,572, filed Nov. 5, 2015, and (e) is a continuation in part of PCT Application PCT/GB2016/051127, filed Apr. 22, 2016, which claims priority to (i) U.S. Provisional Application 62/152,696, filed Apr. 24, 2015, and to (ii) U.S. Provisional Application 62/234,454, filed Sep. 29, 2015, and to (iii) U.S. patent application Ser. No. 15/072,314, filed Mar. 16, 2016, which claims the benefit of U.S. Provisional Application 62/251,572, filed Nov. 5, 2015, and (f) claims priority to foreign application No. 1611433.2, filed in Great Britain on Jun. 30, 2016, which claims priority to (i) U.S. patent application Ser. No. 15/072,314, filed Mar. 16, 2016, which claims the benefit of U.S. Provisional Application 62/251,572, filed Nov. 5, 2015, and to (ii) U.S. Provisional Application 62/309,425, filed Mar. 16, 2016, and to (iii) U.S. Provisional Application 62/354,600, filed Jun. 24, 2016, and to (iv) PCT Application PCT/GB2016/051127, filed Apr. 22, 2016, which claims priority to (1) U.S. Provisional Application 62/152,696, filed Apr. 24, 2015, and to (2) U.S. Provisional Application 62/234,454, filed Sep. 29, 2015, and to (3) U.S. patent application Ser. No. 15/072,314, filed Mar. 16, 2016, which claims the benefit of U.S. Provisional Application 62/251,572, filed Nov. 5, 2015, and (g) claims the benefit of U.S. Provisional Application 62/364,233, filed Jul. 19, 2016, the entire content of each of which is incorporated herein by reference.

FIELD

The present invention relates to optoelectronic switches, and in particular to the topology according to which the constituent switching elements are arranged within that switch.

BACKGROUND

Large-scale packet switches can be built in a scalable fashion from smaller switching elements by connecting the switching elements according to the interconnection pattern of a given network topology. Examples of such network topologies are Folded Clos networks (also called k-ary n-trees), Torus (also called k-ary n-cubes) and "RPFabric topologies" such as those topologies disclosed in PCT/GB2016/051127. These network topologies are hierarchical in nature, meaning that a given implementation of the topology having L tiers or dimensions can be extended (scaled) by adding another tier or dimension to the topology, in such a fashion that the larger (L+1) dimension topology includes a number of identical L-dimensional sub-topologies that are interconnected by the $(L+1)^{th}$ dimension in a recursive fashion.

For an important class of topologies, the maximum scale (i.e. the maximum number of endpoints or nodes) supported by the topology is determined by the radix (i.e. the number of ports) of the constituent switching elements. This is true for e.g. Folded Clos and RPFabric topologies, but not for Torus topologies. Consequently, for topologies in this class, the factor by which the maximum scale of a given topology increases when adding a dimension is also determined by the radix of the switching elements.

It may be preferable and moreover economically advantageous to implement a given network topology using switching elements that are identical. This enables important economies of scale, as the individual switching element is generally implemented as an ASIC which is costly to design, manufacture and test. Requiring different ASICs to build a switch fabric would multiply the associated monetary and temporal costs.

As mentioned above, an example of a known network topology is a Folded Clos topology. In an L-dimensional Folded Clos topology made up of switching elements having a radix R, the maximum number of endpoints is given by:

$$N = 2\left(\frac{R}{2}\right)^L$$

Similarly, an RPFabric topology having L dimensions has a maximum number of endpoints given by:

$$N = \left\lfloor \frac{R}{L+1} \right\rfloor R^L$$

Correspondingly, adding a dimension increases the maximum scales of Folded Clos and RPFabric topologies by a factor of R/2 and R respectively. Depending on the target scale for a specific instantiation, this granularity may be too coarse, in the sense that the maximum scale for L dimensions may be just too small for the target size, whereas the maximum scale for (L+1) dimensions may be much too large. For example, consider a situation where N=8,000 endpoints are required. First, consider the case of an RPFabric topology with R=24 and L=2. The maximum scale in this case is 8×24²=4,608 endpoints, which is clearly too small. Adding an extra dimension leads to a network with a maximum scale of 6×24³=82,944, which is greater than an order of magnitude too large, and therefore highly wasteful.

This problem can be addressed by not fully populating some of the dimensions. For instance, in the example set out above, it would be possible to populate just two of the 24 possible two-dimensional sub-topologies of the three-dimensional network. This leads to topologies where the sizes or cardinalities of the dimensions may vary, thus providing finer granularity in scaling the size of the network. This principle can be applied to a single dimension, or to multiple dimensions. However, it is preferable to apply this approach to scale down an (L+1)-dimension network to sizes that are larger than what the same topology can support with L dimensions. Otherwise it would be more economical to use an L-dimensional network instead. This approach can still incur some inefficiency: because the switching elements all have the same radix R, the switching elements belonging to a scaled-down dimensions have unconnected ports.

SUMMARY

Accordingly, at its most general, embodiments of the present invention provide an optoelectronic switch architecture which provides incremental network scalability while minimizing the number of unused ports on the constituent switching elements. Broadly speaking, embodiments of the present invention achieve this by utilizing the concept of link bundling (also known as "link aggregation", "parallel linking", or "link trunking"). Link bundling is a technique wherein two or more physical ports on a given switching element are treated equivalently in terms of packet forwarding, which allows more generalized topologies, leading to greater efficiency at a finer granularity of switch configurations. The signals transferred from the input to the output device may be either optical or electronic signals, since it is not this feature which is at the heart of embodiments of the invention, rather it is the arrangement of switching elements within the optoelectronic switch which achieves the advantageous technical effects. This is described in greater detail in the remainder of the application.

Throughout this application, the terms "leaf switch" and "leaf" are used interchangeably, as are "spine switch" and "spine".

Accordingly, a first aspect of the present invention provides an optoelectronic switch for transferring a signal from an input device to an output device, the optoelectronic switch including:
  a plurality of leaf switches, each having a radix R, and arranged in an L-dimensional array, in which the i-th dimension has a size $R_i$ where (i=1, 2, . . . , L) and for a reduced dimension, $R_i$ is less than for all of the other dimensions, each leaf switch having an associated L-tuple of coordinates $(x_1, \ldots, x_L)$ giving its location with respect to each of the L dimensions;
  wherein each leaf switch is a member of L sub-arrays, each of the L sub-arrays associated with a different one of the L dimensions, and including:
    a plurality of $R_i$ leaf switches whose coordinates differ only in respect of the i-th dimension, each leaf switch having C client ports for connecting to an input device or an output device, and F fabric ports for connecting to the spine switches,
  each of the L sub-arrays being connected to a plurality of $S_i$ spine switches, each having R fabric ports for connecting to the fabric ports of the leaf switches; and
  wherein, in a given sub-array associated with the reduced dimension, the spine switches each have:
    a connection to each leaf switch in the sub-array, and
    a plurality of connections to at least one leaf switch in the sub-array.

By providing more than one connection between a given spine switch and leaf switch ("link bundling"), the two connections or links are treated equivalently in terms of e.g. packet forwarding. As discussed in the Background section above, when a reduced-size or underpopulated dimension is used in a switch architecture employing constant-radix switching elements, there are unused ports leading to inefficiency. However, the same connectivity, i.e. in terms of bisection bandwidth and path diversity can be achieved by reducing the number of spine switches and employing link bundling. In certain embodiments of the present invention, the number of leaf switches in a given sub-array is therefore greater than the number of spine switches connected to that sub-array.

Switching elements which may be used in embodiments of the present invention are described in U.S. patent application Ser. No. 15/072,314.

In arrangements of spine switches and leaf switches according to embodiments of the present invention, it is possible to send data from any leaf switch (i.e. a source leaf switch) to any other leaf switch in the array (i.e. a final destination leaf switch) using a maximum of L hops (here, "hop" is the transfer of a signal from one leaf switch in a sub-array to another leaf-switch, which is in the same array, the transfer taking place via a spine switch connected to the array). This is possible because the leaf switches are able to act as intermediate switching elements, which can forward a signal coming into one of its F fabric ports, to another of its own fabric ports. This internal forwarding may be performed by an integrated switch inside the leaf switch, e.g. an electronic crossbar switch or an electronic shared-memory switch. Thus during a data transfer operation, data can perform a hop from one leaf switch to another leaf switch (via a spine switch), and then an internal electronic hop within the leaf switch to another fabric port, and then a second hop, along a different dimension (i.e. in a different sub-array of which the (intermediate) leaf switch is also a member). This process may be repeated up to L times, until the data reaches the final destination leaf switch, wherein it is then transferred to an output device, via a client port on that leaf switch.

Optoelectronic switches according to embodiments of the present invention include a plurality of sub-arrays, and more specifically, the number of sub-arrays associated with each dimension (i.e. the j-th dimension) is given by the product of the sizes of all the dimensions bar the dimension in question, or:

$$T_j = \prod_{1, i \neq j}^{L} R_i$$

Accordingly, the total number of sub-arrays in the whole optoelectronic switch is given by the sum of the number of sub-arrays for each dimension, over all L dimensions:

$$T_{total} = \sum_1^L T_j$$

In some embodiments, the layout or structure, i.e. the interconnectivity between the spine switches and the leaf switches is identical or substantially identical for each sub-array associated with a given dimension. There may only be two different sizes $R_i$ of dimension, and in some embodiments, all but one of the dimensions may have a size $R_{large}$ and the remaining dimension has a size $R_{small}$, which is smaller than $R_{large}$. For example e.g. in a 3-dimensional optoelectronic switch: $R_1=R_2=R_{large}=24$, and $R_3=R_{small}=2$. Such embodiments are easier to manufacture, since only one dimension is reduced in size. Having just one dimension reduced in size still provides improved granularity.

In such embodiments, the layout or structure of all of the sub-arrays associated with the dimensions having equal size may be identical or substantially identical. By having identical layouts, the control process, i.e. to determine the path which a given signal takes when traversing a given sub-array, is simplified as the same process can be applied to a plurality of sub-arrays, and a bespoke control process is not required for switching in different dimensions. Details of the methods by which the switching may be controlled may be found later in the application.

In some embodiments, the aggregate client port bandwidth per leaf switch is equal to the fabric port bandwidth available per dimension. Thus, if all of the ports on the switching element have the same bandwidth, this means that one fabric port per dimension should be provided for each client port. In other embodiments, the switching elements may be oversubscribed, i.e., there may be fewer than one fabric port per dimension for each client port, or the switching elements may be overprovisioned, i.e., there may be more than one fabric port per dimension for each client port. In some embodiments, the value of R is a number which is evenly divisible by 2, 3, 4, 5 or 6. In a subset of these embodiments, the value of R is divisible by more than one of 2, 3, 4, 5, and 6. For example, R may be equal to 12, 24, 30, 36, or 60.

In some embodiments, the number of unused ports is minimized, where "unused" refers to fabric ports on the spine switches which are not connected to any fabric ports on any other spine switches or leaf switches (though spine switches may in any event not be connected to other spine switches). Accordingly, in some embodiments, for a given sub-array associated with the reduced dimension, all of the fabric ports included on the plurality of $S_i$ spine switches connected to the sub-array are connected to a fabric port on a leaf switch in that sub-array.

Depending on the number of client ports, the radix of the switches, the number of spine switches connected to the sub-array associated with the reduced dimension, and the number of leaf switches in the sub-array, it may not always be possible to arrange for each of the fabric ports included on the plurality of $S_i$ spine switches to be connected to a respective fabric port on a leaf switch in that sub-array.

If $F_{li}$ is the number of fabric ports per leaf switch in dimension i, and $F_{si}$ is the number of fabric ports per spine switch in dimension i, then in dimension i the total number of spine fabric ports is equal to the total number of leaf fabric ports (and unused fabric ports can be avoided) when the following constraint is met:

$S_i F_{si} = F_{li} R_i$.

If $F_{li}=C$ (i.e., the leaf switches are neither oversubscribed nor overprovisioned) and $F_{si}=R$, the constraint is met (and it is possible to avoid unused fabric ports) if and only if $S_i R = C R_i$, in which $S_i$, R, C and $R_i$ are integer values, having the same meanings as described above. In this way, bisection bandwidth can be maintained (i.e. $S_i R \geq C R_i$) while all of the fabric ports are connected to a fabric port on a leaf switch, to provide connectivity therebetween. In some embodiments, in a given sub-array associated with the reduced dimension, at least one spine switch of the plurality of $S_i$ spine switches connected to the sub-array has a plurality of connections to each of the $R_i$ leaf switches. In other words, one of the spine switches may have two or three connections to each of the leaf switches. In some embodiments, all of the spine switches connected to the sub-array may have a plurality, e.g. two or three, connections to each of the leaf switches in the sub-array. The greater the extent to which the reduced dimension is reduced in size relative to the other dimensions, the greater the number of connections which the spine switches may have to each of the leaf switches.

If $C \gg F_{li}$ (i.e., the leaf switches are oversubscribed) or if $C < F_{li}$ (i.e., the leaf switches are overprovisioned), then the constraint to be met to make it possible to avoid having unused ports may instead be $S_i R = F_{li} R_i$. If each spine switch is connected to more than one sub-array (see, e.g., FIG. 10), then $F_{si} < R$, and the constraint to be met to make it possible to avoid having unused ports (if the leaf switches are neither oversubscribed nor overprovisioned) may instead be $S_i F_{si} = C R_i$. In the remainder of the present disclosure it is assumed, except where otherwise stated (e.g., in the context of FIG. 10), that each spine switch is connected to only one sub-array, and that the leaf switches are neither oversubscribed nor overprovisioned.

In some embodiments, at least one spine switch, or alternatively each spine switch, connected to a given sub-array (associated with the reduced dimension) may have the same number of connections to each leaf switch in the array. This is possible when the number of client ports per leaf switch on the sub-array is divisible by the number of spine switches connected to the sub-array, with integer result. Such embodiments have a high degree of topological regularity, and therefore associated advantages in terms of routing and load balancing. In other embodiments, the number of connections may not be uniform across all of the leaf switches. This is the case when the number of client ports per leaf switch on the sub-array is not divisible by the number of spine switches connected to the sub-array. In these cases, each spine switch connected to a given sub-array associated with the reduced dimension may have:

a first number of connections to each of a first subset of leaf switches;
a second number of connection(s) to each of a second subset of leaf switches;
wherein:
the first number is the same for all of the spine switches,
the second number is the same for all of the spine switches,
the first number is greater than the second number, and
for each spine switch, the first subset of leaf switches is disjoint from the second subset of leaf switches.

It should be noted that it is not necessary that there are a plurality of connections between each spine switch and each leaf switch. In other words, the second number may be exactly one.

Here, "disjoint" means that, for a given spine switch, the first subset and the second subset of leaf switches have no members in common. However, the constituents of the first and second subset of leaf switches for one spine switch may be different from the constituents of the first and second subset of leaf switches for another spine switch, as long as there are the same numbers of leaf switches in each. For example, for one spine switch, there may be three connections to each of a subset of (i.e. containing) two leaf switches, and one connection to each of a subset of (i.e. containing) four leaf switches. These groups of connections may be referred to as "bundles" or "link bundles", and may contain one connection. In some embodiments, the first number is greater than the second number by one. By having the first number and the second number as close as possible, the degree of topological regularity is maximized for those embodiments in which it is not possible to have equal numbers of connections to each leaf switch.

Embodiments among those described above that fulfil the criterion wherein $S_i R = CR_i$ may have no unused ports. However, this is not possible with all arrangements. In some embodiments $S_i R > CR_i$, and according there are $U = S_i R - CR_i$ unused ports. Note that if $S_i R$ is less than $CR_i$, bisection bandwidth may not be preserved. Even though there are some unused fabric ports in the sub-arrays which are associated with the reduced dimension, the number of unused ports is still reduced relative to configurations in which there is a maximum of one connection between each leaf switch and spine switch. The one connection may be a bidirectional connection, which may be in the form of a single cable or wire containing two bundled optical fibres, in other words a bidirectional connection providing physical media allowing full-duplex communication.

It may be possible to maintain both efficiency and topological regularity, even with unused ports in a given sub-array associated with the reduced dimension. In particular, when (as above) the number of client ports is exactly divisible by the number of spine switches connected to the sub-array, the connections and the unused ports can be spread evenly across the spine switches. In other words, each of the spine switches connected to a given sub-array associated with the reduced dimension may have the same number of unused ports, given by $U/S_i$.

In other cases, e.g., where $S_i R > CR_i$ and $C/S_i$ is not an integer, it is still possible to maximize both the efficiency and topological regularity by adopting a configuration wherein for a given sub-array associated with the reduced dimension:
  the spine switches connected to the sub-array are divided into a first subset and a second subset which is disjoint from the first subset, wherein:
  each of the spine switches in the first subset of spine switches has:
    a first number of connections to each of a first subset of leaf switches in the sub-array;
    a second number of connections to each of a second subset of leaf switches in the sub-array, the second subset of leaf switches being disjoint from the first subset, with respect to each spine switch connected to the first subset of spine switches;
  each of the spine switches in the second subset of spine switches has:
    a third number of connections to each of a third subset of leaf switches in the same array;
    a fourth number of connections to each of a fourth subset of leaf switches in the sub-array, the fourth subset of leaf switches being disjoint from the third subset, with respect to each spine switch connected to the second subset of spine switches;
  and wherein:
    the first number is the same for all of the spine switches connected to the first subset of spine switches;
    the second number is the same for all of the spine switches connected to the first subset of spine switches;
    the third number is the same for all of the spine switches connected to the second subset of spine switches;
    the fourth number is the same for all of the spine switches connected to the second subset of spine switches;
    the first number is greater than the second number, and the third number is greater than the fourth number.

Here when the first and second subset of spine switches are "disjoint", this means that no spine switch is a member of both. Similarly, when "the second subset of leaf switches is disjoint from the first subset, with respect to each spine switch in the first subset of spine switches", this means that for a given spine switch in the first subset of spine switches, the first and second subset of leaf switches have no members in common. However, it is possible for a leaf switch which is in the first subset for a first spine switch in the first subset of spine switches to be in the following:
  The first subset for a first spine switch in the second subset of spine switches, or
  The second subset of a second spine switch in the first subset of spine switches, or
  The second subset of a second spine switch in the second subset of spine switches.

The same definition of "disjoint" applies for the third and fourth subset of leaf switches. This is explained in detail with reference to the drawings later on in the application. For the same reasons as above, the first number may be greater than the second number by one, and/or the third number may be greater than the fourth number by one.

The principle of combining spine switches with unused ports can not only be applied with parallel spines connected to the same sub-array. Accordingly, at its most general, in embodiments of a second aspect of the present invention, instead of combining parallel spine switches connected to the same sub-array, a spine switch may connect to leaf switches in more than one sub-array. More specifically, embodiments of a second aspect of the present invention provide an optoelectronic switch for transferring a signal from an input device to an output device, the optoelectronic switch including:
  a plurality of leaf switches of radix R arranged in an L-dimensional array, the ith dimension having a size $R_i$ ($i = 1, 2, \ldots, L$), each leaf switch having an associated L-tuple of coordinates ($x_1, \ldots, x_L$) giving its location with respect to each of the L dimensions;
  wherein each leaf switch is a member of L sub-arrays, each being associated with a different one of the L dimensions, and including $R_i$ switches whose coordinates differ only in respect of the ith dimension, each sub-array further connected to a spine switch connected to all of the leaf switches in the sub-array, wherein for a given sub-array:
  each leaf switch in the sub-array has:
    C client ports, each for connecting to an input device or an output device;
    F fabric ports, for connecting to the spine switch,
  the spine switch has R fabric ports for connecting to fabric ports of leaf switches, and the spine switch has connections to:
  each leaf switch in a first sub-array, and
  at least one leaf switch in a second sub-array, associated with the same dimension as the first sub-array.

In some embodiments, a single spine switch may connect to all leaf switches in a plurality of sub-arrays, each sub-array associated with the same dimension. In addition to reducing the total number of spine switches, such embodiments of the second aspect of the present invention introduce additional connectivity, since the consolidated spines permit movement along two dimensions in a single hop. This can therefore also shorten the average path length (where the path length is the smallest number of hops that may be used to send a signal from a source leaf switch to its final destination leaf switch). Each "hop" is a transfer of data directly between two switches. For example, if a packet of data is sent from a first leaf switch to a first spine switch, and from there to a second leaf switch, the packet has executed two hops. Given a spine switch having a radix R and a given dimension for which $R_i < R$ (i.e. a reduced dimension), with $$x = \left\lfloor \frac{R}{R_i} \right\rfloor,$$

one spine associated with the ith dimension can be used to connect up to x sub-arrays along a second dimension $j \neq i$. As used herein, "along a second dimension", does not mean that the sub-arrays are associated with a different dimension, but that a second dimension is traversed in order to connect to the sub-arrays in e.g. an adjacent sub-array. This is shown visually later in the application.

The number of unused ports per spine is given by $U = R - xR_i$. It is also possible to partially combine sub-arrays. For example, in some embodiments, a spine switch connected to a first sub-array may be connected to a leaf switch (or plurality of leaves) in a second sub-array (in addition to all of the leaf switches in the first sub-array) associated with the same dimension as the first. The spine switch may be connected to all leaf switches having the same co-ordinate in the dimension in question. It is noted that embodiments of the first and second aspects of the present invention may be combined, and each sub-array may be connected to a plurality of spine switches, wherein each spine switch connected to a given sub-array associated with the reduced dimension may have a connection to each leaf switch in the sub-array and a plurality of connections to at least one leaf switch in the sub-array. Accordingly, any of the optional features presented above with reference to embodiments of the first aspect of the present invention may also apply to embodiments of the second aspect of the invention, to the extent that they are compatible.

The following optional features are compatible with embodiments of both the first and second aspects of the present invention.

The leaf switches may contain a packet processor configured to perform packet fragmentation, wherein packets of data having the same next destination switch module (i.e. those packets which are intended for the same leaf switch after the next hop, whether that leaf switch module be the final destination or just the next intermediate switch module in the journey of that packet of data) are arranged into frames having a predetermined size, and wherein packets of data may be split up into a plurality of packet fragments, which are then arranged in a corresponding plurality of frames. Optionally, one frame may contain data from more than one packet of data. Each packet fragment may have its own packet fragment header which includes information at least identifying the packet to which that packet fragment originally belonged, so that the packet may be reconstructed when all of its constituent fragments reach their final destination module.

For example, consider the case where the packet processor is configured so that the frame payload size is 1000 B, and three packets of 400 B, 800 B and 800 B are input into the switch module. If each of these were to be sent in separate frames, of one packet each, this would represent an efficiency of (400+800+800)/3000=67%. However, by using packet fragmentation, a first frame may include the 400 B packet, and 200 B of the first 800 B packet, and then a second frame may include the second 800 B packet and the remaining 200 B of the first 800 B packet. This leads to an efficiency of 100%. The frames that are constructed by this process represent packets of data in their own right, and so further fragmentation may occur at intermediate switch modules, when the packet undergoes more than one hop (e.g., more than one optical hop) in order to reach the destination switch module.

In order to maximize efficiency, subsequent processing of a frame (e.g. forwarding said frame to be converted into a first plurality of optical signals) may not occur until the filling proportion of a frame reaches a set or predetermined threshold, e.g. more than 80%, more than 90%, or when the frame is filled to 100%. The packets may alternatively be sent for subsequent processing after a set or predetermined amount of time has elapsed. In this way, if packets of data for a given switch module cease to arrive at the packet processor, a frame which is still below the threshold filling proportion may still be sent for subsequent processing rather than lying stagnant on the packet processor. The set or predetermined amount of time may be between 50 and 1000 ns, or between 50 and 200 ns. In some embodiments, the time interval is around approximately 100 ns. Accordingly, the packet processor may include or be associated with a transmission side memory in which to temporarily store incomplete frames during their construction. The set or predetermined amount of time may be varied depending upon traffic demand; typically, the higher the rate of traffic flow, the shorter will be the set or predetermined amount of time and lower rates of traffic flow may lead to an increase in the set or predetermined amount of time. The leaf switches may correspondingly include another packet processor, which may be the same as the first packet processor, or may be a different packet processor, which is arranged to recombine the packet fragments upon receiving them, to recreate the original packet of data for subsequent processing and transmission.

Leaf switches may be configured to operate in burst mode, in which the leaf switches send data (e.g. in the form of packets, packet fragments or frames as described above) in a series of successive bursts, each burst containing only data having the same next destination leaf switch. Each successive burst may include a frame of data having a different next destination leaf switch. Pairs of sequential bursts may be separated by a predetermined time interval between 50 and 1000 ns, or between 50 and 200 ns, e.g. 100 ns. All of the leaf switches sending signals within a given sub-array may be able to "fire" a burst synchronously.

To control the switching of data by the spine switches connected to a given sub-array, that sub-array may include an arbiter, considered to control the operation of the spine switches connected to that sub-array, based on destination information contained in the data to be transferred. This control allows the provision of a route which can ensure that all data reaches its next destination leaf switch in a non-blocking fashion to minimize bottlenecking. The arbiter may be connected to a packet processor in each of the leaf switches, either directly or via a controller, or the like. When, for example, a packet of data is received by a leaf switch, a request is sent by the packet processor to the arbiter. The request may optionally identify the next destination leaf switch of a given packet of data. The arbiter is configured to establish a scheme which ensures that, to the greatest extent possible, each packet is able to perform its next hop. The arbiter may accordingly be configured to perform a bipartite graph matching algorithm in order to calculate pairings between the inputs and outputs of the spine switches, such that each input is paired with at most one output, and vice versa. In such embodiments, there may be an arbiter associated with each spine switch, which is configured to control the routing of signals from the inputs to the outputs of the spine switch. Each spine with its respective arbiter may be able to operate independently of the other spine switches connected to the sub-array. Naturally, in some cases, where e.g. several leaf switches send large amounts of data all of which is intended for the same output of a given spine switch, the request cannot be met. Accordingly, the arbiter may be configured to store information relating to requests that cannot be met, in a request queue. Then, until these requests are met, the associated data is buffered on the corresponding leaf switch, e.g. in the packet processor or in a separate memory. In this way, requests that cannot be met are delayed rather than dropped, e.g. when a local bottleneck occurs at one or more of the spine switches. In other words, the arbiter maintains the state of a buffer memory or a virtual output queue (VOQ) on the leaf switches or spine switches, this state can be in the form of counters (counting e.g. the number of packets or bytes per VOQ), or in the form of FIFOs (first-in, first-out) that store packet descriptors. However, the actual packets themselves remain stored on the leaf switch(es) rather than at the arbiter.

When it is necessary for a packet to perform more than one hop in order to reach its final destination leaf switch, the route may be deduced entirely from a comparison between the coordinates of the source leaf switch and the final destination leaf switch. For example, in a process known as dimension ordered routing, the first hop may match the first coordinate of the source and final destination leaf switches, the second hop may match the second coordinate of the source and final destination leaf switches and so on, until all of the coordinates match, i.e. until the packet has been transferred to the final destination leaf switch. For example, in a four-dimensional network, if the source leaf switch were to have coordinates (a, b, c, d) and the final destination leaf switch were to have coordinates (w, x, y, z), then the dimension-ordered route might be: (a, b, c, d)→(w, b, c, d)→(w, x, c, d)→(w, x, y, d)→(w, x, y, z). At any point along the route, the packet processor may compare the coordinates of the source leaf switch against the coordinates of the final destination leaf switch, and determine which coordinates do not yet match. Then it will decide to route along the non-matching directions, e.g. with the lowest index, or the highest index.

DETAILED DESCRIPTION

Figure 1:
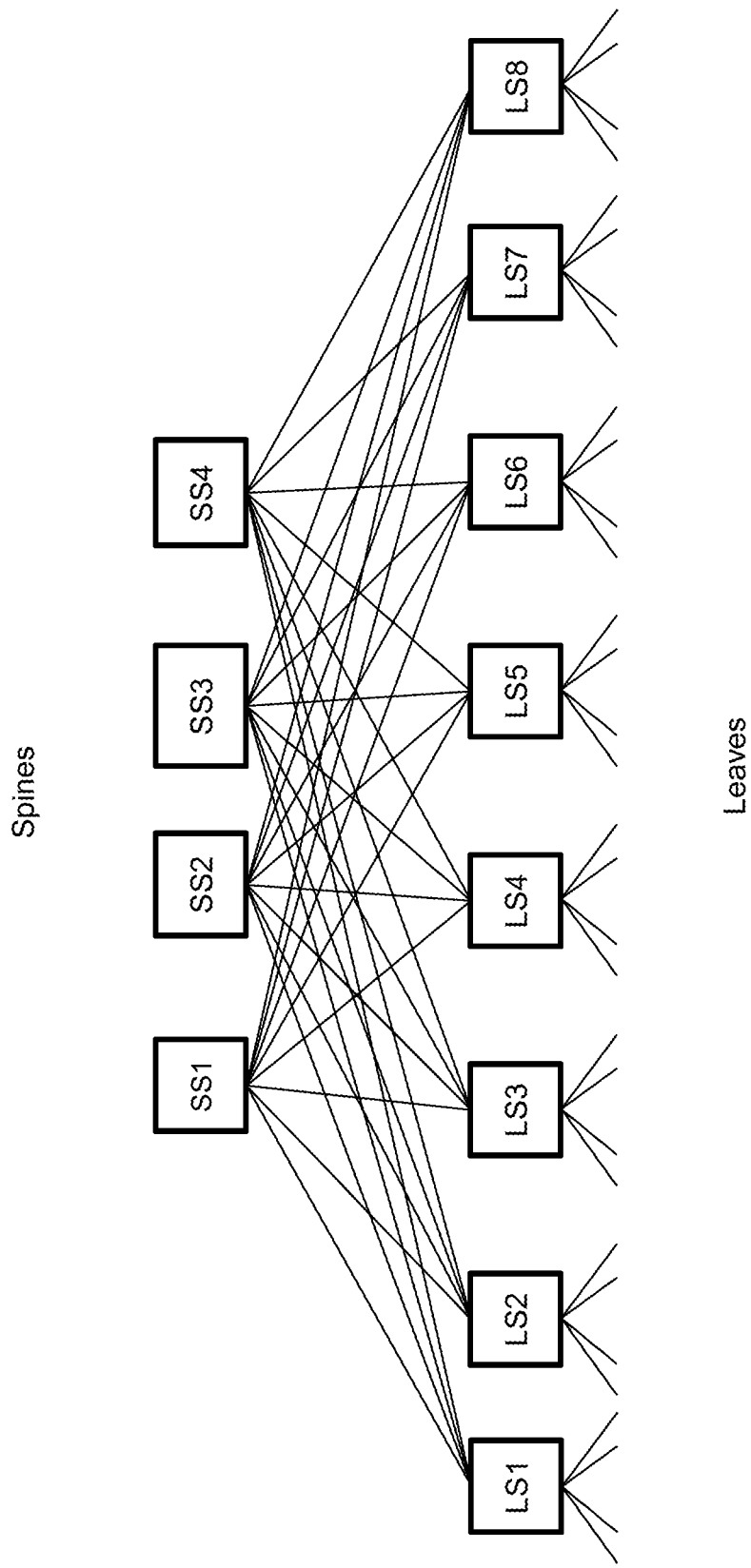
FIG. 1 shows an example sub-array of a switch in which the dimension shown is fully populated.

FIG. 1 shows an example of a fully-populated sub-array of a 1-dimensional array of leaf switches, though it will be apparent that the same interconnectivity may be achieved in sub-arrays of leaf switches which are part of arrays having higher dimensionality. In FIG. 1, L=1, $R_1$=R=8, C=$S_1$=4, and N=32, as discussed in further detail below. As used herein, the "dimension" of an array of leaf switches connected by spine switches is one half of the diameter of the array, where the diameter is defined to be the greatest path length of the path lengths between the pairs of leaf switches in the array. The sub-array shown in FIG. 1 contains $R_1$=8 leaf switches, each having a radix R=8. These leaf switches are connected to each other by $S_1$=4 spine switches, again each having a radix R of 8. Each spine switch has 8 fabric ports, and each of these fabric ports provides a connection to one of the 8 leaf switches. Accordingly, each leaf has 4 fabric ports, and each of these provides a connection to one of the 4 spine switches. In this example, there are no unused ports on any of the spine switches, because the sub-array is fully populated. However, as discussed earlier in the application, it is often undesirable to use a fully-populated L-dimensional topology, since it may provide orders of magnitude too many endpoints, which can be wasteful and therefore uneconomical. As also discussed, this problem can be partially solved by under-populating a given sub-array, though this can still lead to inefficiencies in terms of unused ports.

Figure 2:
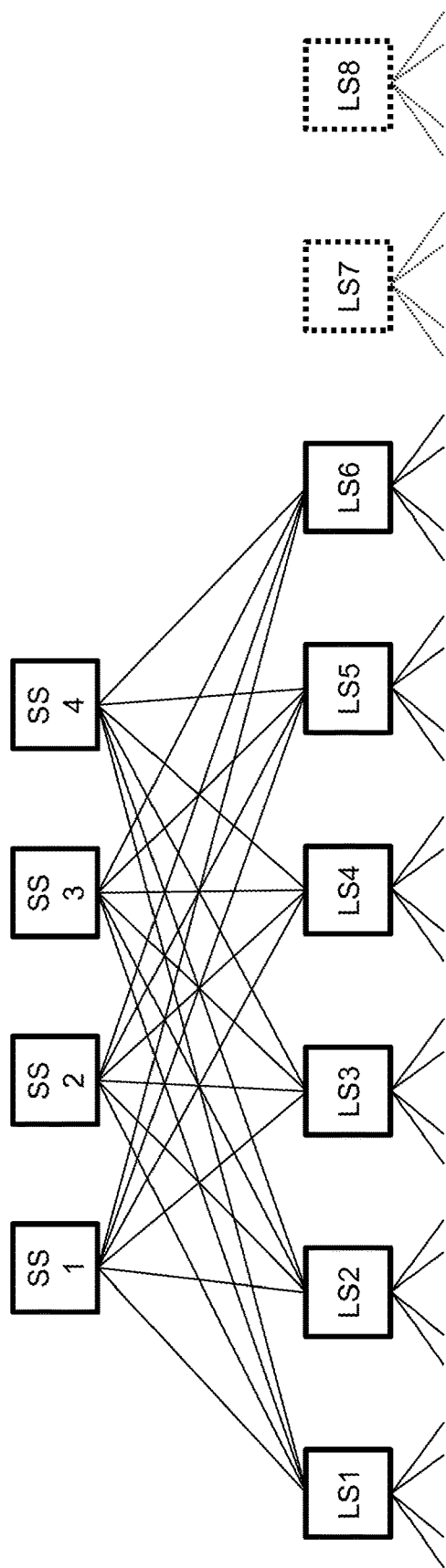
FIG. 2 shows an example sub-array of the switch of FIG. 1, in which the dimension shown is shortened, and is thus no longer fully populated.

An example demonstrating this resulting inefficiency is shown in FIG. 2. In FIG. 2, L=1, $R_1$=R=8, C=$S_1$=4, N=24, and U=8, as discussed in further detail below. Here there are $R_1$=6 leaf switches, but still S=4 spine switches. As with the previous case, each of the leaf switches is connected to each of the spine switches, and each of the spine switches is connected to each of the leaf switches. However, because there are only 6 leaf switches, and each spine switch has R=8 fabric ports, 2 fabric ports on each of the spine switches remain unused. This is a direct consequence of the fact that each spine switch includes a maximum of one connection to each leaf switch. Thus, an inefficiency arises. As is described above, embodiments of the present invention address this problem by rearrangement of the links over fewer spine switches. In this way, fewer spine switches are used, and they are used more efficiently.

FIGS. 3 to 9 are best understood from a mathematical description of the architecture of embodiments of the present invention. Recall that a sub-array $(x_L, \ldots, x_{k+1}, x_{k-1}, \ldots, x_1)$ is defined by a set of leaf switches that differ only in dimension $x_k$, and the sub-array includes this set of leaf switches and is connected to a set of spine switches each connected to all of the leaf switches in the sub-array. As used herein, a spine switch is said to be "connected to" a sub-array (and the sub-array is said to be connected to the spine switch) if and only if the spine switch is connected to at least one of the leaf switches in the sub-array. As used herein, when a sub-array is associated with a dimension, the dimension may equivalently be said to be associated with the sub-array. In FIGS. 3 to 6, some leaf switches (denoted LS1, LS2 etc.) are connected to one spine switch (denoted SS1, SS2 etc.) and some are connected to two spine switches. In order to represent this more clearly, the connections which form the "second" connection between a leaf switch and a spine switch are shown in a thicker black line. For example, it can be seen in FIG. 6 that SS2, has a "second" connection to both LS2 and LS3.

The RPFabric, which is employed in embodiments of the present invention includes spines and leaves in which the leaves are connected only to clients and spines, and the spines are connected only to leaves. Each leaf switch provides C client ports and F fabric ports, where C+F÷R. Each spine switch connected to sub-arrays associated with the $i^{th}$ dimension provides R fabric ports, where $R_i$ of those ports are used to connect to leaf switches within a given sub-array, and where $R_i \leq R$. The numbers of unused ports per switching element is given by the following expressions:

$$U_{leaf} = R - F - C$$

$$U_{spine} = R - R_i$$

The size of a dimension i is denoted by $R_i$, meaning that $R_i$ leaf switches are arranged along the $i^{th}$ axis of the grid. The total number of leaf switches equals the product of all $R_i$. For each $R_i$, $R_i \leq R$ holds, meaning that each spine switch can be connected to all leaf switches in a given sub-array.

In embodiments of the first aspect of the invention, there are multiple spine switches along each dimension, i.e. there are multiple spine switches connected to each sub-array. The number of spine switches for the $i^{th}$ dimension is denoted by $S_i$. If the leaf switches are neither overprovisioned nor oversubscribed, then:

$$C = \left\lfloor \frac{R}{L+1} \right\rfloor$$

$$F = LC = L\left\lfloor \frac{R}{L+1} \right\rfloor$$

In some embodiments, a larger value of C may be used, so that the leaf switches are oversubscribed. This may result in an optoelectronic switch that provides a larger number of client connections, possibly resulting in a reduction in performance at the client ports. In other embodiments, a larger value of F may be used, resulting in leaf switches that are overprovisioned.

Then consider a sub-array including $R_i < R$ leaf switches. There are then $U = C(R - R_i)$ unused ports in total on the set of $S_i$ spine switches connected to that sub-array. Assuming that all sub-arrays associated with that dimension each contain the same number of leaf switches, the number of unused ports is the same for all sub-arrays associated with that dimension. Then, if $C(R - R_i) \geq R$, then at least one spine switch may be removed without affecting the available bandwidth, as long as the existing connections are distributed over the remaining spines. This is where the concept of link bundling, and therefore the technical effect of embodiments of the present invention comes into play, and it will become apparent that four distinct cases arise, all falling within the scope of embodiments of the first aspect of the present invention.

Denoting the actual number of spines for dimension i (i.e., the number of spines connected to each sub-array associated with dimension i, in an embodiment in which the number of spines connected to each such sub-array is the same) by $S_i$, the total number of ports available on the spines connected to a dimension-i sub-array is given by $S_i R$. The total number of ports sufficient for full bisection bandwidth is given by $CR_i$. In order to have zero unused ports, $S_i R = CR_i$. In some embodiments, however (e.g., along the reduced dimension, which includes fewer than the full number of leaf switches), it may instead be the case that $S_i R > CR_i$, e.g., it may be the case that $$S_i = \left\lceil \frac{CR_i}{R} \right\rceil$$

where the ceiling operator is used to select the smallest value of $S_i$ that ensures that every leaf fabric port in dimension i can be used, i.e., connected to a spine fabric port. Thus, there may still be some unused ports, given by $U = S_i R - CR_i$, across the spine switches connected to the same sub-array. Even if there are unused ports, embodiments of the present invention still provide an arrangement in which this number is minimized and the spine switches are utilized in as efficient a manner as possible.

Four cases may be identified, one corresponding to each of FIGS. 3 to 6, each of which include switching elements (i.e. leaf switches and spine switches) all having a radix R=8, and with C=4 client ports, all having the same bandwidth. The following examples all show 1-dimensional cases, but the same principle applies equivalently where the sub-array of leaf switches in question is just one sub-array from an array having higher dimensionality.

The case to which a given configuration of switching elements belongs can be determined by the following two criteria:
  Does $S_i R = CR_i$ hold, so that it is possible to avoid unused ports?
  Can the link bundles be distributed evenly, i.e. is the bundling factor, $$b = \frac{C}{S_i}$$

an integer?

Case 1: In this case, the answer to each of the above two questions is yes. The bundling factor b is an integer, which means that exactly b ports from each leaf switch are connected to each spine connected to the sub-array in question.

Figure 3:
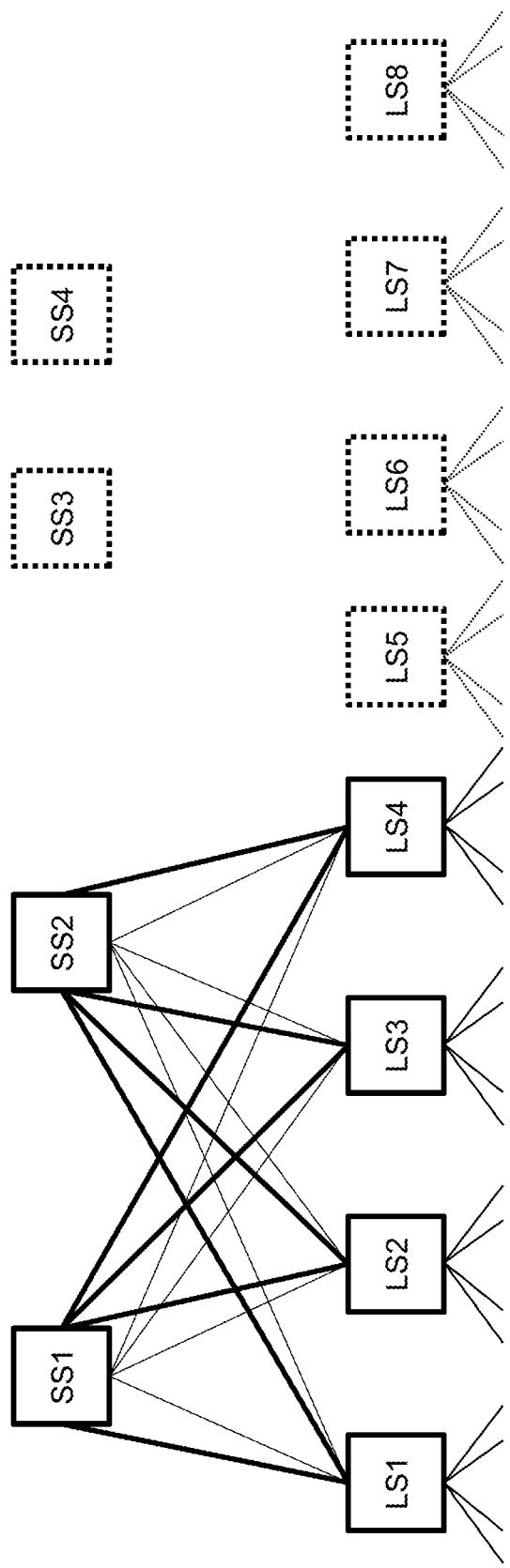
FIG. 3 shows a schematic diagram of a sub-array, which may be found in switches according to embodiments of the first aspect of the present invention.

This case is illustrated in FIG. 3. In FIG. 3, L=1, R=8, C=4, $R_i$=4, $S_1$=2, U=0, N=16, and $b_1$=$b_2$=2, as discussed in further detail below Here there are $R_1$=4 leaf switches in the sub-array, connected using $S_1$=2 spine switches. The bundling factor $$b = \frac{C}{S_i} = 2,$$

and therefore, it can be seen that 2 links from each spine switch are connected to each of the leaf switches. Accordingly, all 8 of the fabric ports on each spine switch are used, maximizing efficiency, especially as compared to the case shown in FIG. 2.

Case 2: In this case, $S_iR$=$CR_i$ but $$b = \frac{C}{S_i}$$

is not, an integer. Thus, all of the fabric ports on all of the spine switches are used, but unlike in the previous example, the links are not distributed evenly amongst the spine switches. More specifically, there are $a_1$ bundles having $$b_1 = \left\lceil \frac{C}{S_i} \right\rceil$$

line in them, and $a_2$ bundles having $$b_2 = \left\lfloor \frac{C}{S_i} \right\rfloor = b_1 - 1$$

links in them. In these cases, the following is true:

$$a_1 b_1 + a_2 b_2 = R$$

$$a_1 + a_2 = R_i$$

It can then be shown that: $a_1 = R - b_2 R_i$ and $a_2 = b_1 R_i - R$.

Figure 4:
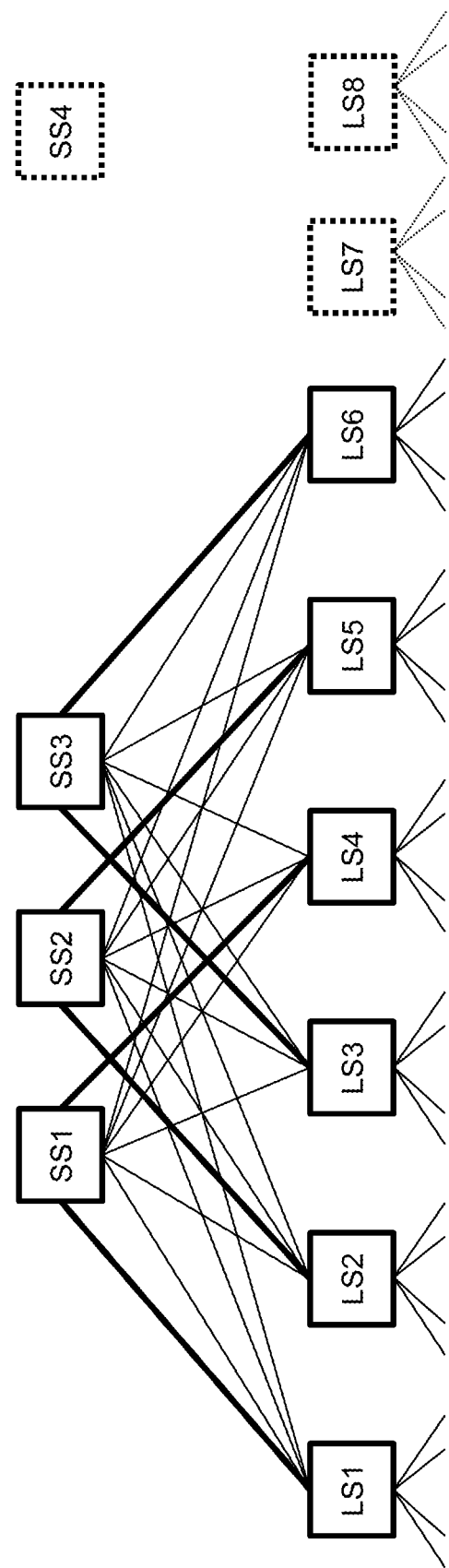
FIG. 4 shows a schematic diagram of a sub-array, which may be found in switches according to embodiments of the first aspect of the present invention.

This is illustrated in FIG. 4, in which there are $S_i$=3 spine switches providing connectivity between $R_1$=6 leaf switches. Again $S_iR$=$CR_i$ (in FIG. 4 $S_iR$=$CR_i$=24), but in this case $$b = \frac{C}{S_i} = \frac{4}{3}$$

which is non-integer. Using the expressions defined above, it can be seen that $a_1$=2, $b_1$=2, $a_2$=4, $b_2$=1. In FIG. 4, L=1, R=8, C=4, U=0, and N=16.

Therefore, the 8 fabric ports on each spine switch are distributed amongst the 6 leaf switches with 1 connection to 4 of the leaf switches and 2 connections to the remaining two leaf switches. The same is true for all of the spine switches, and accordingly each leaf switch has 1 connection to each of 2 of the spine switches, and 2 connections to the third. These connections are distributed evenly so that all 8 of the fabric ports are utilized for each spine switch.

The table below sets out which leaf switches are in the first and second subsets, as described earlier in the application (accordingly, the first number is the first bundling factor, $b_1$=2, and the second number, is the second bundling factor $b_2$=1; $a_1$ and $a_2$ represent the number of leaf switches in the first and second subset respectively):

TABLE 1

Constituent leaf switches of each subset, for the spine switches in FIG. 4

|  | SPINE SWITCH SS1 | SPINE SWITCH SS2 | SPINE SWITCH SS3 |
| --- | --- | --- | --- |
| FIRST SUBSET | LS1, LS4 | LS2, LS5 | LS3, LS6 |
| SECOND SUBSET | LS2, LS3, LS5, LS6 | LS1, LS3, LS4, LS6 | LS1, LS2, LS4, LS5 |

Case 3: In this case, $S_iR$>$CR_i$, but $$b = \frac{C}{S_i}$$

an integer value. Thus, there still remain some unused fabric ports on each of the spine switches, but these are evenly distributed among all of the spine switches. Or equivalently, b fabric ports from each leaf switch are connected to each spine connected to the given sub-array. It therefore follows that the number of unused ports per spine is also uniform in this case:

$$\frac{U}{S_i} = R - \frac{CR_i}{S_i} = R - bR_i.$$

Figure 5:
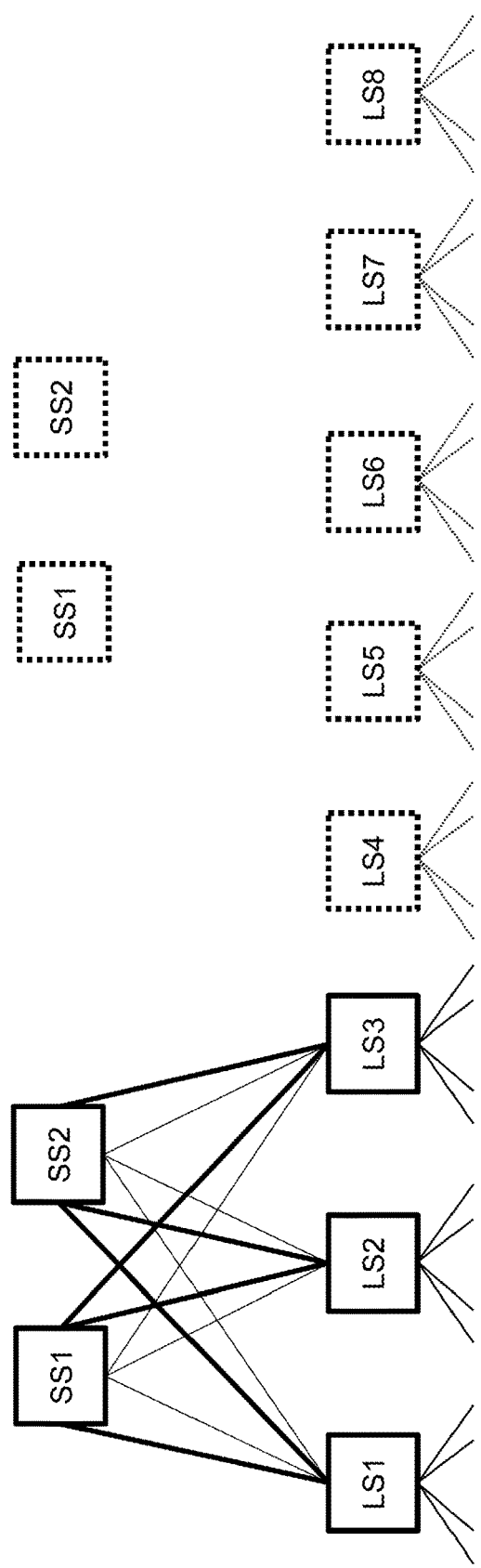
FIG. 5 shows a schematic diagram of a sub-array, which may be found in switches according to embodiments of the first aspect of the present invention.

This example is shown in FIG. 5, in which there are $S_1$=2 spines providing connectivity between $R_1$=3 leaf switches. Thus, there are U=$S_iR$−$CR_i$=4 unused ports, which are distributed evenly across both of the spine switches. Thus, $$b = \frac{C}{S_i} = 2$$

links from each spine switch are connected to each of the leaf switches. This leaves 2 unused ports on each of the spine switches. It can be seen that this arrangement provides the optimum connectivity between the spine switches and leaf switches, and minimizes the number of unused ports. FIG. 5, L=1, R=8, C=4, and N=12.

Case 4: The final case is the most irregular, in which $S_iR$>$CR_i$ and $$b = \frac{C}{S_i}$$

is non-integer. In this case, there are some bundles with $$b_1 = \left\lceil \frac{C}{S_i} \right\rceil$$

links in them, and other bundles with $$b_2 = \left\lceil \frac{C}{S_i} \right\rceil = b_1 - 1$$

links in them. Moreover, there are two disjoint sets of spines: the first set includes $u_1$ spines with $$v_1 = \left\lceil \frac{U}{S_i} \right\rceil$$

unused ports and the second set includes $u_2$ spines with $$v_2 = \left\lfloor \frac{U}{S_i} \right\rfloor$$

unused ports, wherein $u_1 = U - v_2 S_i$ and $u_2 = v_1 S_i - U$, such that $u_1 + u_2 = S_i$.

Each spine in the first set has $a_1 = R - v_1 - b_2 R_i$ bundles of $b_1$ links, and $a_2 = R_i - a_1$ bundles of $b_2$ links.

Correspondingly, each spine in the second set has $a_3 = R - v_2 - b_2 R_i$ bundles of $b_1$ links and $a_4 = R_i - a_3$ bundles of $b_2$ links.

Figure 6:
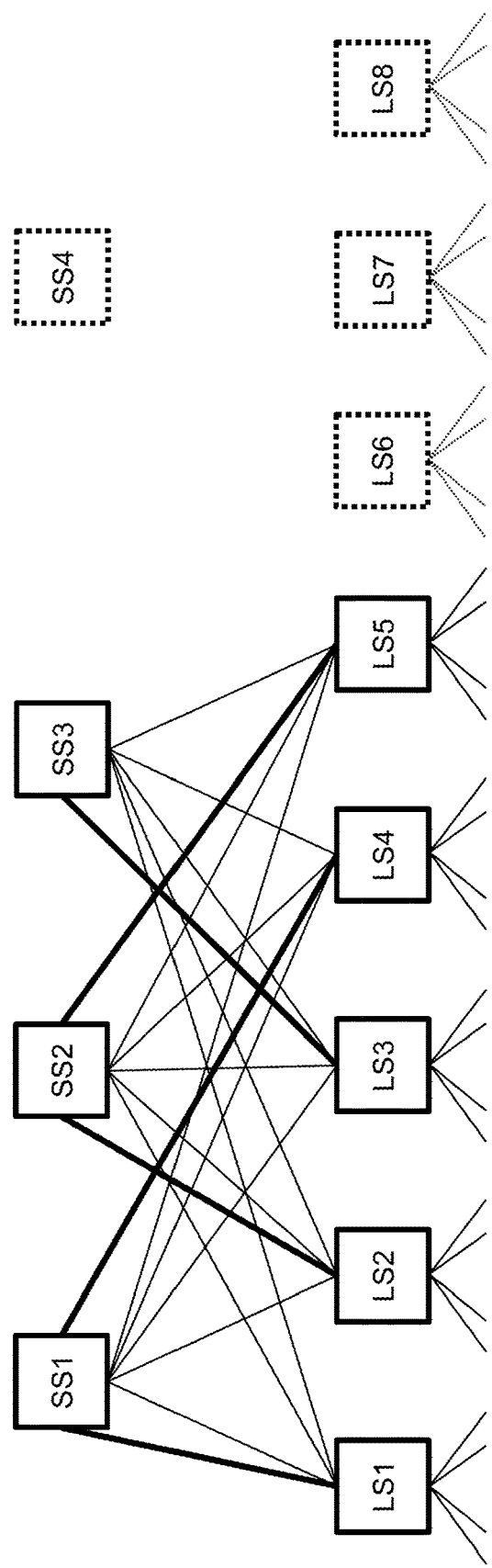
FIG. 6 shows a schematic diagram of a sub-array, which may be found in switches according to embodiments of the first aspect of the present invention.

This example is shown in FIG. 6, in which $S_1 = 3$ spine switches are used to connect $R_1 = 5$ leaf switches. This arrangement is less regular than the previous three cases, but still presents a reduction in the number of unused ports, though the use of link bundling. The spine switches labelled SS1 and SS2 form the first disjoint set, and the spine switch labelled SS3 forms the second disjoint set. Spine switches SS1 and SS2 each have 7 used ports, and 1 unused port. Of the 7 fabric ports which provide connections to the leaf switches, there are 2 bundles of 2, and 3 bundles of 1. Spine switch SS3 has 6 used ports and 2 unused ports. Of the 6 fabric ports which provide connections to the leaf switches, there are 4 bundles of 1, and 1 bundle of 2. FIG. 6, L=1, R=8, C=4, U=4, $v_1 = 2$, $v_2 = 1$, $u_1 = 1$, $u_2 = 2$, and N=20.

The following tables set out which switches are present in which subsets, to use the terminology used earlier in the application. Accordingly, the first number and the third number are equal to the bundling factor $b_1 = 2$, and the second number and the fourth number are equal to the bundling factor $b_2 = 1$; $u_1$ and $u_2$ give the number of spines in each of the subsets of spine switches; $a_1$ and $a_2$ give the number of leaf switches in the first and second subset of leaf switches respectively, and $a_3$ and $a_4$ give the number of leaf switches in the third and fourth subsets respectively.

TABLE 2

Constituent leaf switches of each subset, for spine switches in the first subset of spine switches of FIG. 6.

|  | Spine switch SS1 | Spine switch SS2 |
|---|---|---|
| First subset | LS1, LS4 | LS2, LS5 |
| Second subset | LS2, LS3, LS5 | LS1, LS3, LS4 |

TABLE 3

Constituent leaf switches of each subset, for spine switches in the second subset of spine switches of FIG. 6.

|  | Spine switch SS3 |
|---|---|
| Third subset | LS3 |
| Fourth subset | LS1, LS2, LS4, LS5 |

Figure 7:
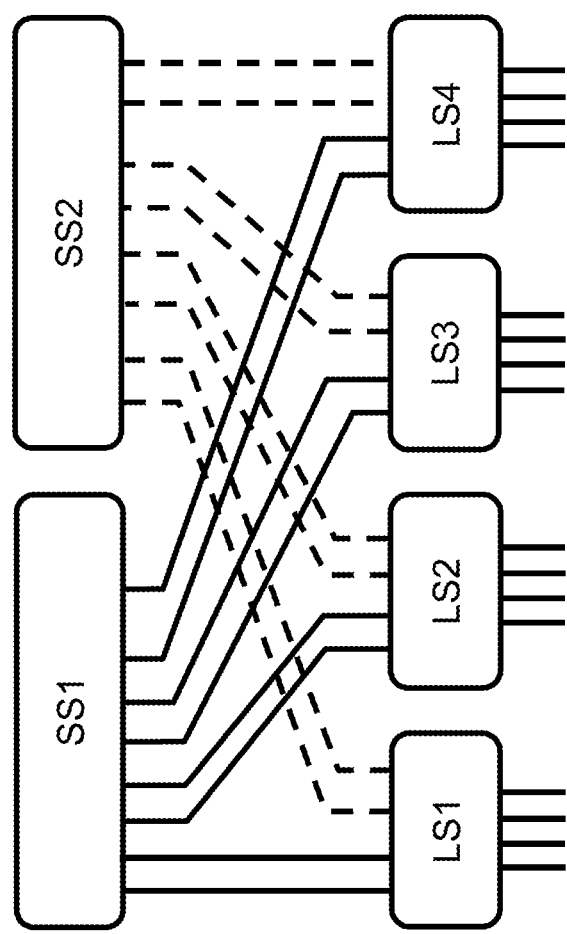
FIG. 7 shows a schematic diagram of a sub-array, which may be found in switches according to embodiments of the first aspect of the present invention.
Figure 8:
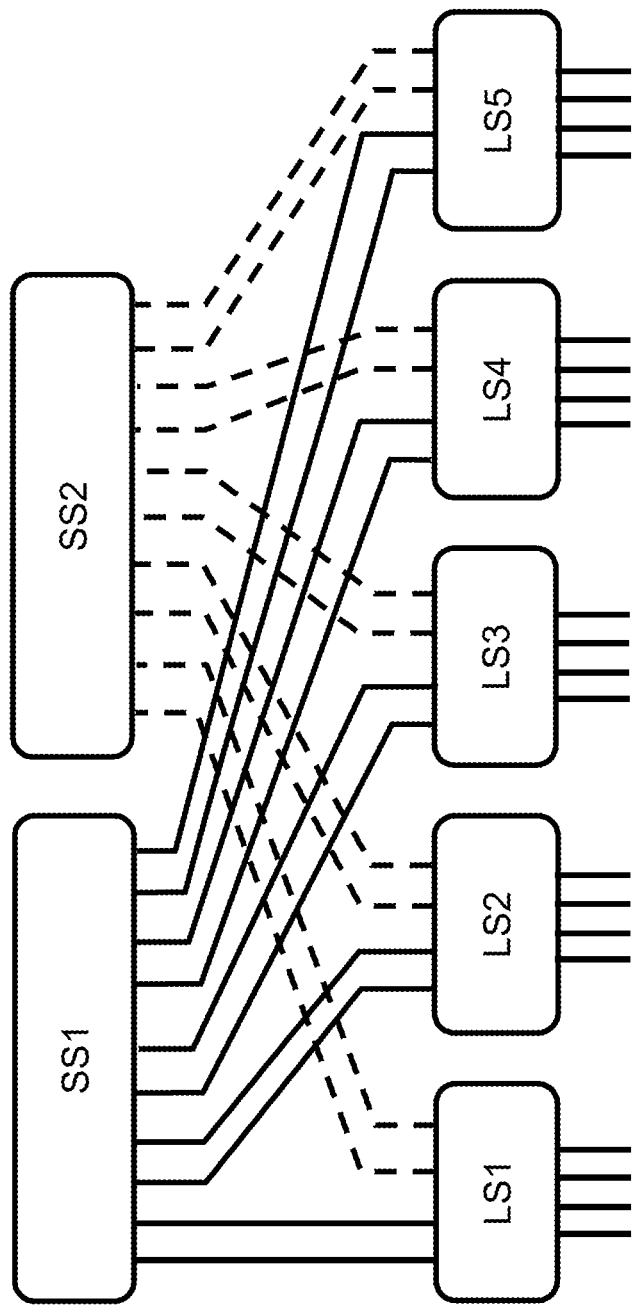
FIG. 8 shows a schematic diagram of a sub-array, which may be found in switches according to embodiments of the first aspect of the present invention.
Figure 9:
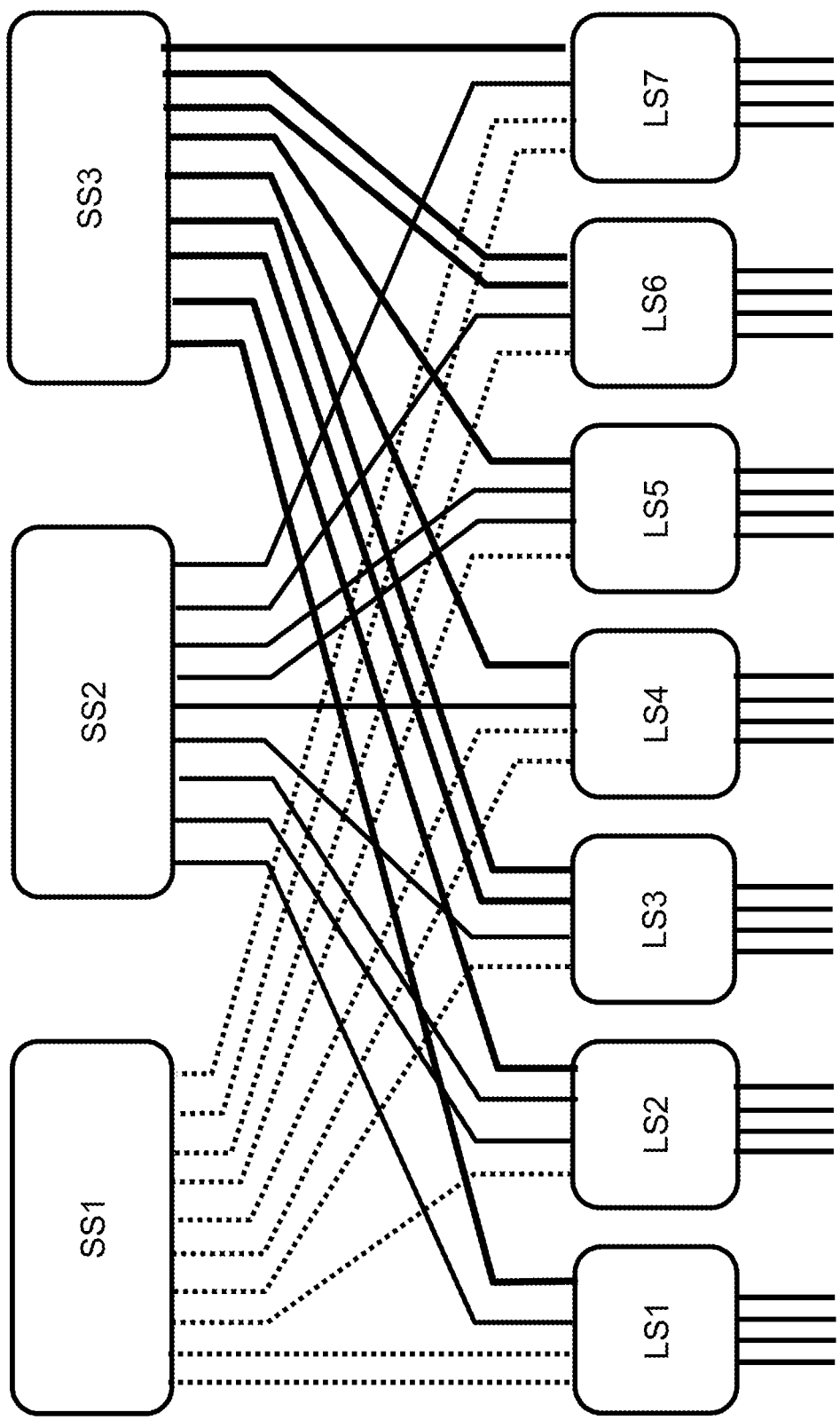
FIG. 9 shows a schematic diagram of a sub-array, which may be found in switches according to embodiments of the first aspect of the present invention.

FIGS. 7 to 9 show examples of parts of two dimensional optoelectronic switches according to embodiments of the present invention. It must be noted that only one sub-array is shown in each of these drawings. In these drawings, the different types of connecting line represent connections from different spine switches connected to the sub-array shown. FIGS. 7 and 8 show embodiments in which L=2, R=12, $R_1$ (not shown)=12, and $R_2$ (which is shown)=4. This embodiment falls into case 3 above, since $S_2 R = 2 \times 12$ is greater than $CR_2 = 4 \times 4$, but $$\frac{C}{S_2} = \frac{4}{2} = 2,$$

which is an integer. Accordingly, there are U=24−16 unused ports across the two spine switches, i.e. 4 on each, and two connections to each spine switch SS1-2 from each leaf switch LS1-4. In other words, each of the spine switches has 4 bundles of 2 links per leaf.

In FIG. 8, $R_2 = 5$, rather than 4, as in the previous case. Therefore, $CR_2 = 4 \times 5 = 20$, and so U=4, i.e. there are 2 unused ports on each spine switch, but again these are evenly distributed since $$\frac{C}{S_2} = 2$$

still. Each leaf switch LS1-4 therefore has two links connected to each of the spine switches SS1-2, or in other words, each spine switch has 5 bundles of 2 links per leaf. Again, this falls into case 3 as described above.

FIG. 9 is an example of case 4. Here, L=2, R=12, $R_1$ (not shown)=12, and $R_2$ (shown)=7. Thus, $S_i R = 36$, $CR_i = 28$, giving U=8. Since $$\frac{C}{S_i} = \frac{4}{3}$$

is not integer valued, these unused ports are not evenly distributed across the spine switches. There is therefore an irregular connection pattern, as compared to the previous examples. The connections are as follows:

Each leaf has 1 link bundle of 2 and 2 "link bundles" of 1.

Spine SS1 has 3 link bundles of 2 and 5 of 1 (10 links total, 2 unused)

Spines SS2 and SS3 have 2 link bundles of 2 and 5 of 1 (2×9 links total, 2×3 unused).

As above, the following tables summarize which leaf switches fall within which subset, as defined earlier in the application:

TABLE 4

Constituent leaf switches of each subset, for spine switches in the first subset of spine switches of FIG. 9.

|  | Spine switch SS1 |
|---|---|
| First subset (2 links) | LS1, LS4, LS7 |
| Second subset (1 link) | LS2, LS3, LS5, LS6 |

TABLE 5

Constituent leaf switches of each subset, for spine switches in the second subset of spine switches of FIG. 9.

| | Spine switch SS2 | SPINE SWITCH SS3 |
|---|---|---|
| Third subset (2 links) | LS2, LS5 | LS3, LS6 |
| Fourth subset (1 link) | LS1, LS3, LS4, LS6, LS7 | LS1, LS2, LS4, LS5, LS7 |

The table below shows examples of which cases various configurations of switching elements fall into, in an optoelectronic switch having 2 dimensions (L=2), a switching element radix R=12, and for C=4 client ports. In particular the values of all of the other parameters described above are shown, when a given dimension is reduced to $R_i$=2, 3, ..., 12, for $S_i$=1, 2, 3, 4 spine switches.

TABLE 6

Values of various parameters, varying with the size of the reduced dimension and the number of spine switches in sub-arrays associated with that dimension.

| L | 2 | 2 | 2 | 2 | 2 | 2 | 2 | 2 | 2 | 2 | 2 |
|---|---|---|---|---|---|---|---|---|---|---|---|
| R | 12 | 12 | 12 | 12 | 12 | 12 | 12 | 12 | 12 | 12 | 12 |
| C | 4 | 4 | 4 | 4 | 4 | 4 | 4 | 4 | 4 | 4 | 4 |
| $R_i$ | 2 | 3 | 4 | 5 | 6 | 7 | 8 | 9 | 10 | 11 | 12 |
| $S_i$ | 1 | 1 | 2 | 2 | 2 | 3 | 3 | 3 | 4 | 4 | 4 |
| Case: | 3 | 1 | 3 | 3 | 1 | 4 | 4 | 2 | 3 | 3 | 1 |
| R\|CR$_i$ | FALSE | TRUE | FALSE | FALSE | TRUE | FALSE | FALSE | TRUE | FALSE | FALSE | TRUE |
| S\|C | TRUE | TRUE | TRUE | TRUE | TRUE | FALSE | FALSE | FALSE | TRUE | TRUE | TRUE |
| U | 4 | 0 | 8 | 4 | 0 | 8 | 4 | 0 | 8 | 4 | 0 |
| $b_1$ | 4 | 4 | 2 | 2 | 2 | 2 | 2 | 2 | 1 | 1 | 1 |
| $b_2$ | 4 | 4 | 2 | 2 | 2 | 1 | 1 | 1 | 1 | 1 | 1 |
| $a_1$ | 0 | 0 | 0 | 0 | 0 | 2 | 2 | 3 | 0 | 0 | 0 |
| $a_2$ | 2 | 3 | 4 | 5 | 6 | 5 | 6 | 6 | 10 | 11 | 12 |
| $a_3$ | 0 | 0 | 0 | 0 | 0 | 3 | 3 | 3 | 0 | 0 | 0 |
| $a_4$ | 2 | 3 | 4 | 5 | 6 | 4 | 5 | 6 | 10 | 11 | 12 |
| $V_1$ | 4 | 0 | 4 | 2 | 0 | 3 | 2 | 0 | 2 | 1 | 0 |
| $V_2$ | 4 | 0 | 4 | 2 | 0 | 2 | 1 | 0 | 2 | 1 | 0 |
| $u_1$ | 0 | 0 | 0 | 0 | 0 | 2 | 1 | 0 | 0 | 0 | 0 |
| $u_2$ | 1 | 1 | 2 | 2 | 2 | 1 | 2 | 3 | 4 | 4 | 4 |

Figure 10:
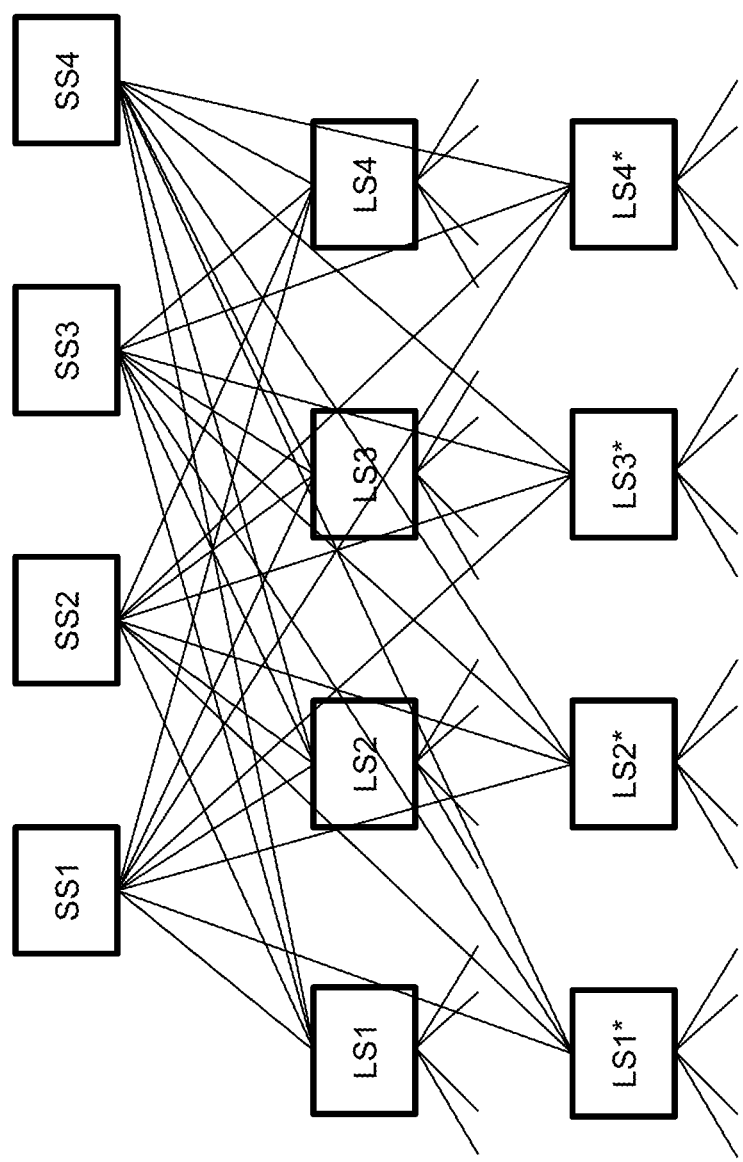
FIG. 10 shows an example of a configuration of the connections between the leaf switches in, and spine switches connected to, two different sub-arrays associated with the same dimension, according to embodiments of the second aspect of the present invention.

FIG. 10 shows an embodiment of the second aspect of the present invention. Here, the two rows of leaf switches LS/LS* are different sub-arrays which are associated with the same dimension, which is the "horizontal" direction, when the drawing is viewed with the page oriented in landscape. Each of the spine switches here has a radix R=8, and each of the sub-arrays has a size $R_i$=4. Accordingly, to use the notation used earlier in the application $$x = \frac{R}{R_i} = 2,$$

and so each of the spine switches SS1-3 is able to connect to all of the leaf switches in the two sub-arrays. Although in FIG. 10 each spine switch is connected to all of the leaf switches, the array may be two-dimensional as a result of each of the spine switches being configured (e.g., programmed) to forward data along only one of the two dimensions.

What is claimed is:

1. An optoelectronic switch for transferring a signal from an input device to an output device, the optoelectronic switch comprising:
   an array of leaf switches, the array having L dimensions, each of the leaf switches having a radix R, R and L being integers greater than 1, the size of the array being less, in a reduced dimension of the L dimensions, than in each of the other dimensions of the L dimensions, each of the leaf switches having an associated L-tuple of coordinates giving its location in the array with respect to each of the L dimensions; and
   a plurality of spine switches,
   wherein the array consists of a plurality of overlapping sub-arrays, each of the sub-arrays being associated with a dimension of the L dimensions and consisting of $R_i$ of the leaf switches, wherein $R_i$ is the size of the array in the dimension associated with the sub-array, the coordinates of the leaf switches of the sub-array differing only in respect of the dimension associated with the sub-array, each of the sub-arrays being connected to a respective plurality of spine switches of the plurality of spine switches,
   wherein each of the leaf switches is a member of L sub-arrays of the sub-arrays, each of the L sub-arrays being associated with a different one of the L dimensions,
   wherein each of the leaf switches has:
      a plurality of client ports for connecting to an input device or an output device; and
      a plurality of fabric ports for connecting to the spine switches,
   wherein each spine switch has R fabric ports for connecting to fabric ports of the leaf switches of the array, and
   wherein each of the spine switches connected to a first sub-array of the plurality of sub-arrays, the first sub-array being associated with the reduced dimension, has:
      a connection to each of the leaf switches in the sub-array, and
      a plurality of connections to at least one of the leaf switches in the sub-array.

2. The optoelectronic switch of claim 1, wherein all of the fabric ports of each of the plurality of spine switches connected to the first sub-array are connected to a fabric port on a leaf switch in the first sub-array.

3. The optoelectronic switch of claim 1, wherein a spine switch of the plurality of spine switches connected to the first sub-array has a plurality of connections to each of the leaf switches in the first sub-array.

4. The optoelectronic switch of claim 1, wherein a spine switch of the plurality of spine switches connected to the first sub-array has the same number of connections to every leaf switch in the first sub-array.

5. The optoelectronic switch of claim 1, wherein each of the spine switches connected to the first sub-array has the same number of connections to every leaf switch in the first sub-array.

6. The optoelectronic switch of claim 1, wherein each of the spine switches connected to a second sub-array of the plurality of sub-arrays has:
   at least one connection to each leaf switch in the second sub-array;
   a first number of connections to each of a first subset of the leaf switches in the second sub-array;
   a second number of connections to each of a second subset of the leaf switches, disjoint from the first subset, in the second sub-array,
wherein:
   the first number is the same for all of the spine switches connected to the second sub-array,
   the second number is the same for all of the spine switches connected to the second sub-array, and
   the first number is greater than the second number.

7. The optoelectronic switch of claim 6, wherein the first number is one greater than the second number.

8. The optoelectronic switch of claim 1, wherein at least two of the fabric ports of the plurality of spine switches connected to the first sub-array are unused.

9. The optoelectronic switch of claim 8, wherein the number of unused ports is the same on each of the spine switches connected to the first sub-array.

10. The optoelectronic switch of claim 8, wherein:
   the plurality of spine switches connected to the first sub-array consists of a first subset of spine switches and a second subset of spine switches, disjoint from the first subset of spine switches;
   each of the spine switches in the first subset of spine switches has:
      a first number of connections to each of a first subset of leaf switches in the first sub-array; and
      a second number of connections to each of a second subset of leaf switches in the first sub-array, the second subset of leaf switches being disjoint from the first subset of leaf switches;
   each of the spine switches in the second subset of spine switches has:
      a third number of connections to each of a third subset of leaf switches in the first sub-array; and
      a fourth number of connections to each of a fourth subset of leaf switches in the first sub-array, the fourth subset of leaf switches being disjoint from the third subset of leaf switches;
   and wherein:
      the first number is the same for all of the spine switches in the first subset of spine switches;
      the second number is the same for all of the spine switches in the first subset of spine switches;
      the third number is the same for all of the spine switches in the second subset of spine switches;
      the fourth number is the same for all of the spine switches in the second subset of spine switches;
      the first number is greater than the second number, and the third number is greater than the fourth number.

11. The optoelectronic switch of claim 10, wherein:
    the first number is one greater than the second number; and/or
    the third number is one greater than the second number.

12. An optoelectronic switch for transferring a signal from an input device to an output device, the optoelectronic switch comprising:
    an array of leaf switches, the array having L dimensions, each of the leaf switches having a radix R, R and L being integers greater than 1, the size of the array being less, in a reduced dimension of the L dimensions, than in each of the other dimensions of the L dimensions, each of the leaf switches having an associated L-tuple of coordinates giving its location in the array with respect to each of the L dimensions; and
    a plurality of spine switches,
    wherein the array consists of a plurality of overlapping sub-arrays, each of the sub-arrays being associated with a dimension of the L dimensions and consisting of $R_i$ of the leaf switches, wherein $R_i$ is the size of the array in the dimension associated with the sub-array, the coordinates of the leaf switches of the sub-array differing only in respect of the dimension associated with the sub-array, each of the sub-arrays being connected to a respective spine switch of the plurality of spine switches,
    wherein each of the leaf switches is a member of L sub-arrays of the sub-arrays, each of the L sub-arrays being associated with a different one of the L dimensions,
    wherein each of the leaf switches has:
       a plurality of client ports for connecting to an input device or an output device; and
       a plurality of fabric ports for connecting to the spine switches,
    wherein each spine switch has R fabric ports for connecting to fabric ports of the leaf switches of the array, and
    wherein a first spine switch is connected to a first sub-array of the plurality of sub-arrays and has R fabric ports each connected to a fabric port of a leaf switch of the array, and the spine switch has connections to:
       each of the leaf switches in a first sub-array of the plurality of sub-arrays, and
       a leaf switch of the leaf switches in a second sub-array of the plurality of sub-arrays, associated with the same dimension as the first sub-array.

13. The optoelectronic switch of claim 12, wherein the first spine switch is connected to a first plurality of leaf switches in a respective first plurality of sub-arrays of the plurality of sub-arrays, each associated with the same dimension, the leaf switches of the first plurality of leaf switches all having the same co-ordinate with respect to the dimension with which each sub-array of the first plurality of sub-arrays is associated.

14. The optoelectronic switch of claim 12, wherein the first spine switch is connected to a leaf switch in every sub-array, of the plurality of sub-arrays, associated with the same dimension as the first sub-array and the second sub-array.

15. The optoelectronic switch of claim 12, wherein each spine switch of a first plurality of spine switches connected to a second sub-array of the plurality of sub-arrays has:
    a connection to each leaf switch in the second sub-array, and
    a plurality of connections to at least one leaf switch in the second sub-array.

16. The optoelectronic switch of claim 15, wherein a spine switch of the first plurality of spine switches has a connection to each of the leaf switches in a first plurality of sub-arrays of the plurality of sub-arrays, each sub-array of the first plurality of sub-arrays being associated with the same dimension.

\* \* \* \* \*